March 24, 1953  K. H. BARNEY  2,632,886
NULL BALANCE INDICATOR
Filed Jan. 2, 1952

INVENTOR
KAY H. BARNEY
BY
Paul B. Hunter
ATTORNEY

Patented Mar. 24, 1953

2,632,886

UNITED STATES PATENT OFFICE 2,632,886

NULL BALANCE INDICATOR

Kay H. Barney, Great Neck, N. Y., assignor to The Sperry Corporation, a corporation of Delaware Application January 2, 1952, Serial No. 264,579

7 Claims. (Cl. 340—253)

This invention relates to apparatus for indicating a null balance between two variable signals, and more particularly, relates to apparatus for triggering an external load at the exact instant two relatively variable direct current signals pass through condition of substantially equal potential.

Various null indicators have been heretofore proposed in the prior art, one such known null indicator being a differential amplifier in which a pair of triodes with their plate loads comprise the two branches of a bridge circuit. The variable signals between which a null is to be indicated are applied to the respective grids of the triodes, and a balance is measured by suitable means, such as a meter, connected between the respective plates.

However, the differential amplifier type null indicator has limited sensitivity around the null point, and the absolute D. C. level of the input signals at null is limited to a relatively small range within the bias operating range of the triodes. Increased sensitivity has been achieved by providing additional stages of D. C. amplification but drift in the various stages results in a shift of the apparent null point.

It is the general object of this invention to avoid the foregoing and other difficulties in and objections to the prior art practices by the provision of a null balance indicator which is characterized by its stability, increased sensitivity around the null, relative simplicity, and positive action in its operation.

Another object of this invention is to provide apparatus for indicating the relative polarity of two variable D. C. signals.

Another object of this invention is the provision of apparatus which gives an accurate indication of the instant one variable signal exceeds or drops below the potential of a reference signal.

Another object of this invention is to provide an apparatus which will give an indication at the instant two D. C. signals are at the same potential regardless of the absolute level of that potential.

Another object of this invention is the provision of a null indicating device which triggers a relay when two variable D. C. signals reach a null condition.

These and other objects of the invention which will become apparent as the description proceeds are achieved by the provision of apparatus comprising a synchronous switch driven from an alternating current source. The switch is adapted to alternately connect each of two input signals to the input of a high gain alternating current type amplifier, the input to the amplifier being a substantially square wave signal of peak-to-peak amplitude equal to the difference between the potentials of the direct current input signals to the switch and of a repetition frequency determined by the frequency of the alternating current source. A thyratron tube having a relay connected in series therewith is connected across the same alternating current source, so that the plate voltage on the thyratron is in phase or 180° out of phase with respect to the square wave signal. The output of the amplifier is connected to the control grid of the thyratron tube, and the bias of the tube is adjusted so that the tube fires when the two signals are at substantially equal potentials.

For a better understanding of the invention, reference should be had to the accompanying drawing herein wherein.

Figure 1:
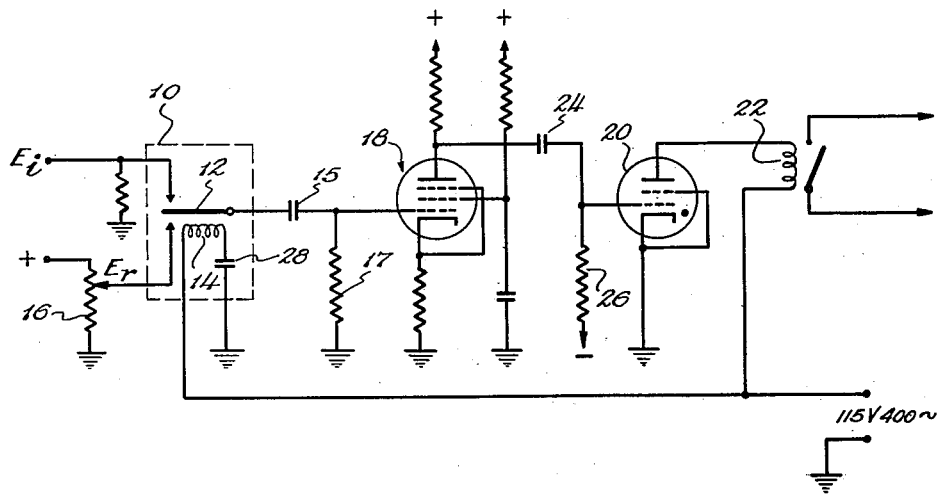
Fig. 1 is a schematic wiring diagram of the invention.

With particular reference to the form of the invention illustrated in the drawings, the numeral 10 indicates generally a vibrating switch or chopper, and includes a vibrating reed 12 which is driven by the magnetic field of a coil 14 connected across a source of alternating current 13. The vibrating reed 12 alternately connects to each of two D. C. input signals $E_i$ and $E_r$. $E_r$ may be a reference potential as derived, for example, from a potentiometer 16.

The vibrating reed 12 alternately connects the two input signals to a resistance-capacity-coupled amplifier 18, which is preferably a high gain single pentode stage. Assuming that $E_i$ and $E_r$ are at different potentials, the input to the RC coupling network of the amplifier 18 will be substantially a square wave signal of repetition frequency determined by the frequency of the alternating current source, with the amplitude of the square wave signal being equal to half the difference in potential between $E_r$ and $E_i$, as illustrated graphically in Fig. 3. The values of the coupling condenser 15 and the resistance 17 are chosen to provide a relatively short time constant to prevent a bias charge from building up.

The output of the amplifier 18 is coupled to the control grid of thyratron 20. Connected in series with the plate of the thyratron 20 is a load, such as a relay 22, the relay and thyratron being connected across the alternating current source. Thus, the plate voltage on the thyratron is in phase with the voltage driving the vibrating switch 10. While the load is illustrated as a relay, any other suitable means may be connected in series with the thyratron 20 responsive to conduction of the thyratron, such as an electric light or meter for indicating that a null has been reached or crossed.

Figure 2A:
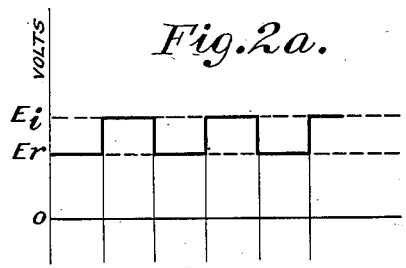
Figs. 2 and 3 are graphs used to aid in the description of the invention.
Figure 3A:
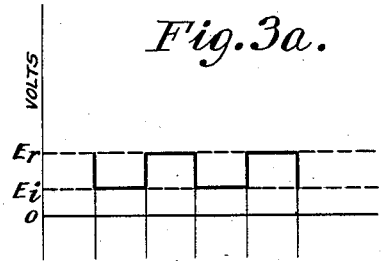
Figure 2B:
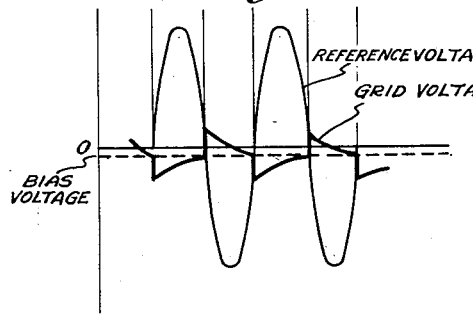
Figure 3B:
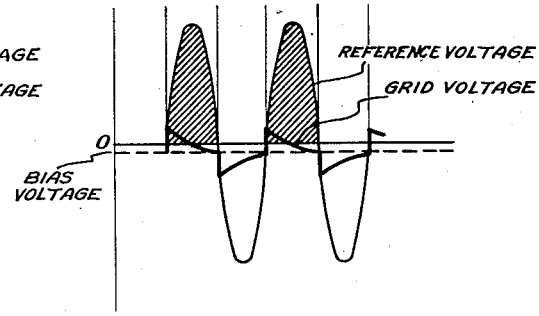

The operation of the invention can best be understood by reference to Figures 2 and 3. Assuming that the input signal $E_1$ has a higher potential than the reference signal $E_r$, the potential on the vibrating reed 12 as a function of time will be substantially a square wave as illustrated in Figure 2A. This square wave signal is differentiated and amplified by the amplifier 18, and coupled to the control grid of the thyratron 20 through a coupling condenser 24. A negative bias is applied to the thyratron control grid through a grid resistor 26.

The phase and wave shape of the signal at the control grid of the thyratron 20 is shown by the grid voltage curve of Figure 2B. Condenser 24 and resistor 26 produce a peaked wave which is essentially the derivative of the square wave signal derived from the vibrator 10. The relatively small time constant of the R. C. coupling prevents a large self-biasing voltage to develop on the grid of the thyratron 20. With $E_1$ higher in potential than $E_r$, the grid voltage is 180° out of phase with respect to the plate voltage of the thyratron 20, the thyratron is non-conductive, and no current flows through the relay 22. Because there is a certain phase lag between the voltage applied to the vibrator coil 14 and the mechanical oscillations of the vibrating reed 12, a condenser 28 is placed in series with the coil 14 to adjust the phase relationship of the square wave signal relative to the plate voltage on the thyratron 20.

As the potential $E_1$ drops below $E_r$, the phase of the square wave signal from the vibrator 10 is reversed as shown in Figure 3A. As a result the grid voltage and plate voltage of the thyratron 20 are in phase, making the thyratron conductive, and energizing the relay 22. The bias voltage on the thyratron control grid is adjusted so that conduction starts when $E_r$ and $E_1$ are substantially equal, the bias being such as to hold the thyratron non-conductive when no input signals are present. Thus, the thyratron is in effect a phase-sensitive discriminator. However, it is a discriminator that is positive acting at the instant there is a phase reversal of the chopped alternating voltage made up of the control signal and the reference voltage.

From the above description, it will be recognized that the objects of the invention have been achieved by the provision of a null balance indicator which effectively indicates, as for example, by closing a relay, when two signals of relatively varying potential reach or pass through a null condition where they are of substantially equal potential. The invention is particularly useful where one signal is rapidly dropping in potential and where it is desired to initiate some operation at the exact instant the signal reaches a predetermined level as set by a reference potential. The high gain of the amplifier insures that with even small input signals, the amplitude of the voltage applied to the grid of the thyratron has a large voltage swing as the null condition is crossed. While a high vacuum triode might be employed in place of the thyratron, the thyratron provides a more sensitive "on"-"off" control which is responsive to the 180° phase shift of the control grid voltage effected at the null condition.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for indicating the comparative potential of two variable input signals comprising a vibrator-type switch driven from an alternating current source, a high gain resistance-capacity-coupled amplifier, the switch alternately connecting each of said input signals to the input of the amplifier, a thyratron tube having a plate and control grid, the control grid being coupled to the output of the amplifier, and a relay connected in series with the thyratron tube, the tube and relay being connected across said alternating current source whereby the plate voltage of the thyratron is synchronized with the vibrator-type switch.

2. Apparatus for indicating the comparative potential of two variable input signals comprising a vibrator-type switch driven from an alternating current source, a high gain resistance-capacity-coupled amplifier, the switch alternately connecting each of said input signals to the input of the amplifier, a thyratron tube having a plate and control grid, the control grid being coupled to the output of the amplifier, and indicating means connected in series with the thyratron tube, the tube and indicating means being connected across said alternating current source whereby the plate voltage of the thyratron is synchronized with the vibrator-type switch.

3. Apparatus for indicating the comparative potential of two variable input signals comprising a vibrator-type switch driven from an alternating current source, amplifying means, the switch alternately connecting each of said input signals to the input of the amplifying means, a thyratron tube having a plate and control grid, the control grid being coupled to the output of the amplifying means, and indicating means connected in series with the thyratron tube, the tube and indicating means being connected across said alternating current source whereby the plate voltage of the thyratron is synchronized with the vibrator-type switch.

4. Apparatus for indicating the comparative potential of two variable input signals comprising a vibrator-type switch driven from an alternating current source, and a thyratron tube having a plate and control grid, the control grid being coupled to the output of the vibrator-type switch, the vibrator-type switch alternately coupling each of said input signals to the control grid of the thyratron, the tube being connected across said alternating current source whereby the plate voltage of the thyratron is synchronized with the vibrator-type switch.

5. Apparatus for indicating the comparative potential of two variable input signals comprising a vibrator-type switch driven from an alternating current source, amplifying means, the switch alternately connecting each of said input signals to the input of the amplifying means, the output of said amplifier being substantially a square wave signal of amplitude proportional to the difference in potential between said input signals and phase determined by the relative level in potential, and phase responsive means coupled to the output of said amplifying means for comparing the phase of said square wave signal to the phase of said alternating current source, said phase responsive means being triggered substantially at the instant of phase reversal of said square wave signal.

6. A null balance indicator comprising switching means, amplifying means connected to the switching means, the switching means alternately connecting each of two input signals to the amplifying means, a thyratron tube having a grid circuit and plate circuit, the output of the amplifying means being coupled to one of the thyratron circuits, indicating means, and an alternating voltage source synchronized with said switching means, the indicating means being connected in series with the other of said thyratron circuits and said voltage source.

7. A voltage comparator apparatus comprising first and second input circuits, an alternating signal amplifier, switching means connected to the input of the amplifier for alternately connecting said first and second input circuits to the amplifier, a thyratron having a grid circuit and plate circuit, means coupling one of the thyratron circuits to the output of the amplifier, and means for supplying an alternating voltage synchronous with the alternate coupling operation of the switching means to the other of said thyratron circuits.

KAY H. BARNEY.

REFERENCES CITED

The following references are of record in the file of this patent:

UNITED STATES PATENTS

| Number | Name | Date |
|---|---|---|
| 2,113,221 | Pullis | Apr. 5, 1938 |
| 2,409,559 | Haight | Oct. 15, 1946 |
| 2,409,560 | Haight | Oct. 15, 1946 |